3,271,225
LABELING PROCESS

Carl Fritz Walter Wolf, Wilmington, Del., assignor to E. I. du Pont de Nemours and Company, Wilmington, Del., a corporation of Delaware
No Drawing. Filed June 26, 1963, Ser. No. 290,589
7 Claims. (Cl. 156—315)

This invention relates to the production of labeled containers. More particularly, this invention relates to a process for the production of plastic bottles labeled with plastic labels.

It is an object of this invention to provide a process for the production of plastic bottles with plastic labels. It is a further object of this invention to provide a process for the production of plastic bottles having scuff-proof plastic labels. It is a further object of this invention to provide a process for the production of a plastic bottle with a plastic label intimately and uniformly bonded to its surface. It is a further object of this invention to provide a process for the production of plastic bottles which are labeled with a thin transparent plastic film which has been printed in such a manner that the printed surface is laminated next to the plastic bottle and therefore cannot be scuffed. Other objects will be apparent to one skilled in the art from the remainder of the specification.

The above objects are achieved according to the present invention by the following steps:

(1) A printed plastic film label is coated on the printed surface with a thermo-sensitive adhesive.

(2) A bottle to be labeled is heated to a temperature greater than the temperature required to render the thermo-sensitive adhesive of the printed plastic film label active.

(3) The heated bottle is then contacted with the surface of the printed plastic film label which had been previously coated with a thermo-sensitive adhesive.

(4) The label is then smoothed onto the bottle surface. This may be readily accomplished by rolling the bottle on a heated surface. The use of a heated surface has the additional advantage in that it does not allow rapid cooling of the bottle and thus helps to insure that the temperature of the bottle remains high enough to activate the thermo-sensitive adhesive of the label.

Although it is generally desirable to maintain the temperature of the bottle above the temperature at which the thermo-sensitive adhesive is active, during the initial contact between the bottle and the label, it is also possible to operate the process of this invention when the bottle is at a temperature slightly less than that necessary to render the thermo-sensitive adhesive active. This can be done by applying a pressure-sensitive adhesive to the leading edge of the label to be applied to the bottle or by applying a pressure-sensitive adhesive to the surface of the heated bottle. The label is then picked up by means of the pressure-sensitive adhesive and held in place while the bottle and its label is rolled over a heated surface which brings the temperature of both objects to above the temperature required to render the thermo-sensitive adhesive active.

In the preferred embodiment, the bottle to be labeled is polyethylene, and the manner of heating the bottle is a flaming treatment, such as that described in U.S. Patent No. 2,648,097, issued to M. F. Kritchever, on Aug. 11, 1953. According to this patent, a polyethylene body is passed through a flame in such a manner that only the surface is heated above the temperature at which the polyethylene would melt. The surface is then permitted to harden to produce a surface that is permanently adherent to decorative matter. In the process of the present invention the polyethylene bottle is heated only instantaneously at its surface to a temperature above its melting point by the flame, and thus by the time it contacts the coated surface of the label, it is below its melting point but at a temperature sufficiently high to render the thermo-sensitive adhesive active. The heating may also be accomplished by means of electrical heaters and the like, although such treatment does not give the conditioned surface of the flaming process.

Labels used in this process should have a low coefficient of sliding friction so that they can be readily separated from each other. They should also have a high degree of stiffness. On the order of 100,000 to 200,000 p.s.i. initial tensile modulus is a satisfactory stiffness. Linear polyethylene film of about 2 mils thickness is a very satisfactory film for this purpose. Other satisfactory films include polyethylene terephthalate films and laminates of polyethylene terephthalate and polyethylene as well as cellophane laminated to polyethylene.

The thermo-sensitive adhesive which is applied to the label in the coating operation should be active at a temperature below the melting point of the plastic of the bottle. In particular, the temperature at which the coating should be active should be less than 150° C. and preferably from 70 to 90° C. Satisfactory thermo-sensitive adhesive coatings include polymers of acrylonitrile-butadiene-styrene terpolymers containing about 8% acrylonitrile, 42% butadiene and 50% styrene, blended with a suitable plasticizer such as cyclohexyl phthalate in the amount of about 70 parts per 30 parts of polymer. This adhesive coating may be applied to the surface of the printed film label by forming a solution of the adhesive in a 1 to 1 mixture of benzene and methyl-ethyl ketone, and spraying the solution on the printed film, followed by drying. Other commercially available thermally active coatings may also be employed.

If it is desirable to use a pressure-sensitive adhesive on the label or on the bottle in order to hold the label in place as the thermo-sensitive adhesive is activated, such pressure-sensitive adhesive may be 50/50 copolymers of ethylene vinyl acetate having molecular weights of about 50,000 to 100,000. Such pressure-sensitive adhesives are known in the art as "hot pick-up gums." These adhesives may be applied with a brush to the heated bottles. Other commercially available pressure-sensitive adhesives may also be employed.

In the following examples which illustrate but do not limit the invention, all parts and percentages are in parts by weight, unless otherwise stated.

Example I

A linear polyethylene bottle having the capacity of approximately 500 cubic centimeters was heated by rotating the bottle in a hydrocarbon flame. The bottle was heated to a temperature such that its surface temperature was above its melting point, that is 150° C. The bottle was then contacted with a linear polyethylene film that had been printed and coated on one side with a terpolymer of 8% acrylonitrile, 442% butadiene, and 50% styrene, plasticized with 70 parts cyclohexyl phthalate per 30 parts of terpolymer to a thickness of about 2 mil by spraying. The coating had an activation temperature of about 80° C.

The bottle was rolled over the smooth surface heated to about 70° C. Sufficient pressure was applied to the bottle to smooth out bubbles or wrinkles that appeared between the film and the bottle. The bottle was then cooled to room temperature. The label adhered uniformly to the bottle.

Example II

The process of Example I was repeated using substantially the same conditions. The label was printed in such a manner that the printed surface was coated with the thermo-active terpolymer, and the printing was readable through the linear polyethylene film. The resulting product was substantially scuff-proof.

Example III

The process of Example I was repeated using a bottle such as that described in the previous example. The bottle was then heated using a flame treatment to a temperature at its surface slightly above the melting point of the polyethylene. A small line of ethylene vinyl acetate pressure-sensitive adhesive was applied to the surface of the bottle. The bottle was then rolled across a coated label in the manner as described in the previous examples and then across a heated smooth metal plate to smooth the wrinkles and bubbles from the surface. A highly satisfactory article was obtained.

Example IV

The process of Example III was repeated, only the bottle was made to contact the surface of the coated label by rolling it across the label. The bottle picked up the label and was further heat-treated to seal the label to the bottle on a smooth plate heated to a temperature of 90° C. In this instance the bottle had cooled to a temperature below the activation point of the thermo-sensitive adhesive prior to its contacting the label but the temperature of the heated plate was sufficient to activate the thermo-sensitive adhesive and form a tight bond with the polyethylene of the bottle.

Example V

The process of Example IV was repeated using an electrical heater instead of the flame treatment. Once again, the bottle was allowed to cool to a temperature less than that necessary to activate the thermo-sensitive adhesive, and a small line of pressure-sensitive adhesive was applied to a leading edge of the label prior to contacting the bottle with the label. As in the previous example, the heat of the metal plate across which the bottle rolled was sufficient to raise the temperature of the bottle laminate composition sufficiently high that the thermo-sensitive adhesive was made active and a tight bond was formed.

I claim:

1. A process for the production of labeled plastic bottles which comprises the steps of coating a plastic film with a thermo-sensitive adhesive, coating a portion of the thermo-sensitive adhesive with a pressure-sensitive adhesive, heating a thermoplastic bottle to a temperature at least about as high as that necessary to render the thermo-sensitive adhesive active, contacting the heated bottle with the coated plastic film while said bottle is at a temperature above that necessary to render the thermo-sensitive adhesive active, whereby said plastic film becomes attached to said plastic bottle.

2. The process of claim 1 in which the bottle is heated to a temperature above the temperature necessary to render said thermo-sensitive adhesive active by contacting the heated bottle and the coated film with an additional heat source.

3. The process of claim 1 in which the heating step comprises subjecting the bottle to a flaming treatment.

4. The process of claim 3 in which the plastic bottle is polyethylene.

5. The process of claim 1 in which plastic film is printed on the surface that contacts the plastic bottle.

6. The process of claim 1 in which the plastic film is polyethylene terephthalate and in which the coating on the plastic film contains a copolymer of acrylonitrile, butadiene and styrene.

7. The process of claim 1 in which the plastic film is linear polyethylene.

References Cited by the Examiner

UNITED STATES PATENTS

| | | | |
|---|---|---|---|
| 2,435,267 | 2/1948 | Cahn | 156—321 |
| 2,673,826 | 3/1954 | Ness | 161—92 |
| 2,684,775 | 7/1954 | Von Hofe | 156—521 X |
| 2,786,778 | 3/1957 | Palmquist | 117—12 |
| 2,836,528 | 5/1958 | Ford | 161—231 X |
| 2,865,765 | 12/1958 | Allen | 161—231 X |
| 2,981,432 | 4/1961 | Flood | 156—566 X |
| 3,151,193 | 9/1964 | Thornton | 156—572 |

FOREIGN PATENTS

| | | |
|---|---|---|
| 556,171 | 3/1958 | Canada. |

OTHER REFERENCES

Skeist: (I) Handbook of Adhesives, Reinhold, N.Y. City, 1962, pp. 230, 236–238, and 486.

EARL M. BERGERT, *Primary Examiner.*

C. B. COSBY, *Assistant Examiner.*